US007760971B2

(12) United States Patent
Chien

(10) Patent No.: US 7,760,971 B2
(45) Date of Patent: Jul. 20, 2010

(54) ANTI-EMI LENS MODULE

(75) Inventor: Tien-Yuan Chien, Taipei (TW)

(73) Assignee: International Currency Technologies Corporation, Taipei (TW)

( * ) Notice: Subject to any disclaimer, the term of this patent is extended or adjusted under 35 U.S.C. 154(b) by 244 days.

(21) Appl. No.: 11/896,175

(22) Filed: Aug. 30, 2007

(65) Prior Publication Data

US 2009/0057095 A1 Mar. 5, 2009

(51) Int. Cl.
*G02B 6/12* (2006.01)
*G02B 6/26* (2006.01)
*G02B 6/32* (2006.01)
*G02B 7/02* (2006.01)

(52) U.S. Cl. ........................... 385/14; 385/33; 359/808; 359/809; 359/811; 359/819

(58) Field of Classification Search ....................... None
See application file for complete search history.

(56) References Cited

U.S. PATENT DOCUMENTS 5,034,616 A * 7/1991 Bercovitz ................... 250/556
5,988,345 A * 11/1999 Bergeron et al. ............ 194/203
2004/0212055 A1* 10/2004 Exposito et al. ............. 257/678
2006/0278946 A1* 12/2006 Shiraishi et al. ............. 257/433
2008/0173832 A1* 7/2008 Chien et al. ................. 250/556

* cited by examiner

*Primary Examiner*—Michelle R Connelly Cushwa
(74) *Attorney, Agent, or Firm*—Bacon & Thomas, PLLC

(57) ABSTRACT

An anti-EMI lens module used in a bill acceptor is disclosed to include a circuit board, which has a plurality of electric recognition devices and a grounding device surrounding the electric recognition devices, a holder base mounted on the circuit board and holding a lens device and having a plurality of through holes respectively aimed at the electric recognition devices and a metal conducting layer disposed in contact with the grounding device of the circuit board and forming with the grounding device a grounding loop for absorbing and discharging static electricity during operation of the bill acceptor to protect the electric recognition devices against static electricity, radiowave and electromagnetic interference.

18 Claims, 6 Drawing Sheets

ANTI-EMI LENS MODULE

BACKGROUND OF THE INVENTION

1. Field of the Invention

The present invention relates to lens modules and more particularly, to an anti-EMI (static electricity, radiowave and electromagnetic interference) lens module for use in a bill acceptor for detecting the authenticity of a bill. The lens module has multiple positioning structures to have a lens device positively and accurately positioned in between a holder base and a top cover.

2. Description of the Related Art

Following fast development of technology, our mode of living has been changed. Various automatic vending machines (card dispensers, ticket vending machines, money exchanging machines, etc.) are used everywhere to sell any of a variety of products without serviceman. Providing automatic vending machines saves much labor cost, and brings great convenience to consumers. A money-exchanging machine generally comprises a coin acceptor and a bill acceptor.

However, venders and consumers are always assailed by the problem of counterfeit money since the use of paper currency. Following development of computer technology, evil persons may use a computer to scan, copy and print paper money. Therefore, a paper currency has anti-counterfeiting techniques. Visible anti-counterfeiting techniques of paper currency include paper material, ink, seal, mark and etc. that can easily be verified with the eyes. However, examining invisible anti-counterfeiting techniques requires a precision bill acceptor or validator. A bill acceptor or validator for this purpose uses electric recognition devices to detect different characteristics of bills or valuable securities.

However, the use of a bill acceptor or validator must consider the problem of interference of internal electromagnetic noises from internal electronic devices and external electromagnetic noises from external cell phones or radio transmitting devices. Under the interference of static electricity, radiowave or electromagnetic noises, the electric recognition devices (such as photo sensors) may produce a false signal, lowering the reliability of the bill acceptor or validator.

Further, either conductors or non-conductors may produce electric charges under a certain condition. Almost all substances can produce static electricity. When a valuable security (banknote, license, IC card) is inserted into an automatic vending machine, the plastic (or rubber) rollers of the bill transferring mechanism are rotated to carry the inserted security forwards for recognition. Friction between the plastic (or rubber) rollers of high insulative resistance of the bill transferring mechanism and the valuable security may produce static electricity of static potential as high as 10 KV. The amount of cumulative static electricity has a great concern with the speed of the rollers of the bill transferring mechanism. The faster the speed of the rollers is, the higher the cumulative amount of static electricity will be. Therefore, the conventional bill acceptor or validator has the following drawbacks:

1. After a long use of the machine, a big amount of static electricity will be cumulated in the plastic shells, and cumulated static electricity will be discharged from the plastic shells when reached a certain amount. This discharge of static electricity will interfere with the functioning of the IC chips of the recognition devices of the bill acceptor or validator, causing a recognition error. Further, external electromagnetic noises may also interfere with the performance of the bill acceptor or validator, resulting in a recognition error. Therefore, conventional bill acceptor or validator may frequently receive a big amount of false bills. Further, a recognition error may cause machine shutdown.

2. When an automatic vending machine is used to sell tobacco, alcohol, drugs or other controlled products, it needs to recognize the age or real identification of the client and stores the related data in the memory of the bill acceptor for checking whether the client meets the legal age requirement or not. A static electricity interference may cause loss of storage data, resulting in unrecoverable consequences.

3. When electric charges are discharged after accumulation of a big amount of static electricity, an electric shock may occur in the internal electronic devices or circuit board of the bill acceptor or validator, causing damage to the electronic devices and memory of the machine. This damage may result in a big loss or increase of maintenance cost.

4. Discharge of static electricity may damage the bill acceptor, and discharging sparks may cause inflammable gas or substance (valuable securities) to burn. Burning of inflammable gas or substance in the bill acceptor may cause the automatic vending machine to explode, resulting in an unexpected catastrophe.

Therefore, it is desirable to provide a reliable, high-performance bill acceptor that has means to absorb and discharge static electricity, eliminating interferences of electromagnetic noises.

SUMMARY OF THE INVENTION

The present invention has been accomplished under the circumstances in view.

According to one aspect of the present invention, an electrically conductive holder base is installed in a circuit board and disposed at the top side of the recognition devices at the circuit board to form an EMI shielding device that discharge static electricity, protecting the recognition devices against static electricity, radiowave and electromagnetic interference, enhancing the reliability, stability and durability of the recognition devices, and lowering the chance of detection error or failure of the recognition devices. Therefore, the use of the present invention in an automatic vending machine greatly reduces the chance of receiving false banknotes or machine shutdown.

According to another aspect of the present invention, when a bill acceptor is checking the authenticity of the inserted bill, static electricity produced upon friction between the bill transferring mechanism and the inserted bill will be cumulated in the bill acceptor and the cumulated static electricity will be discharged out of the bill acceptor when reached a certain amount. Discharging static electricity may interfere with the functioning of the electric recognition devices of the bill acceptor, lowering the reliability of the bill acceptor. By means of the use of the anti-EMI lens module, the metal conducting material of the holder base absorbs static electricity and discharges absorbed static electricity through the grounding device of the circuit board, protecting the electric recognition devices against static electricity, radiowave and electromagnetic interference.

According to still another aspect of the present invention, when an automatic vending machine is used to sell tobacco, alcohol, drugs or other controlled products, it needs to recognize the age or real identification of the client and stores the related data in the memory of the bill acceptor for checking whether the client meets the legal age requirement. By means of the effect of the metal conducting layer of the holder base to discharge static electricity through the grounding device of the circuit board, the invention prevents loss of storage data, ensuring accurate checking of the client's legal age and identification.

According to still another aspect of the present invention, discharging of a big amount of cumulative static electricity may cause an electric shock, thereby damaging the internal electronic devices, circuit board and memory of the bill acceptor. In this case, a loss of storage data may occur. By means of the effect of the metal conducting layer to absorb cumulative static electricity and to discharge absorbed static electricity through the grounding device of the circuit board, the invention well protects the internal electronic devices and circuit board of the bill acceptor against damage of static electricity, lowering the risk of failure and the maintenance cost.

According to still another aspect of the present invention, discharge of static electricity may damage the bill acceptor, and discharging sparks may cause inflammable gas or substance (valuable securities) to burn. By means of the effect of the metal conducting layer to absorb cumulative static electricity and to discharge absorbed static electricity through the grounding device of the circuit board, the invention prevents unexpected catastrophes resulting from discharging sparks. Therefore, the use of the design of the present invention in an automatic vending machine gives a good protection.

According to still another aspect of the present invention, in the small-sized bill acceptor, static electricity may be produced at the friction area between parts, i.e., the friction area between the bill transferring mechanism of the bill acceptor and the bill. By means of the metal conducting layer to discharge static electricity through the grounding device of the circuit board, it needs not to install an additional static electricity eliminator in the limited inside space of the bill acceptor.

DETAILED DESCRIPTION OF THE PREFERRED EMBODIMENT

Figure 1:
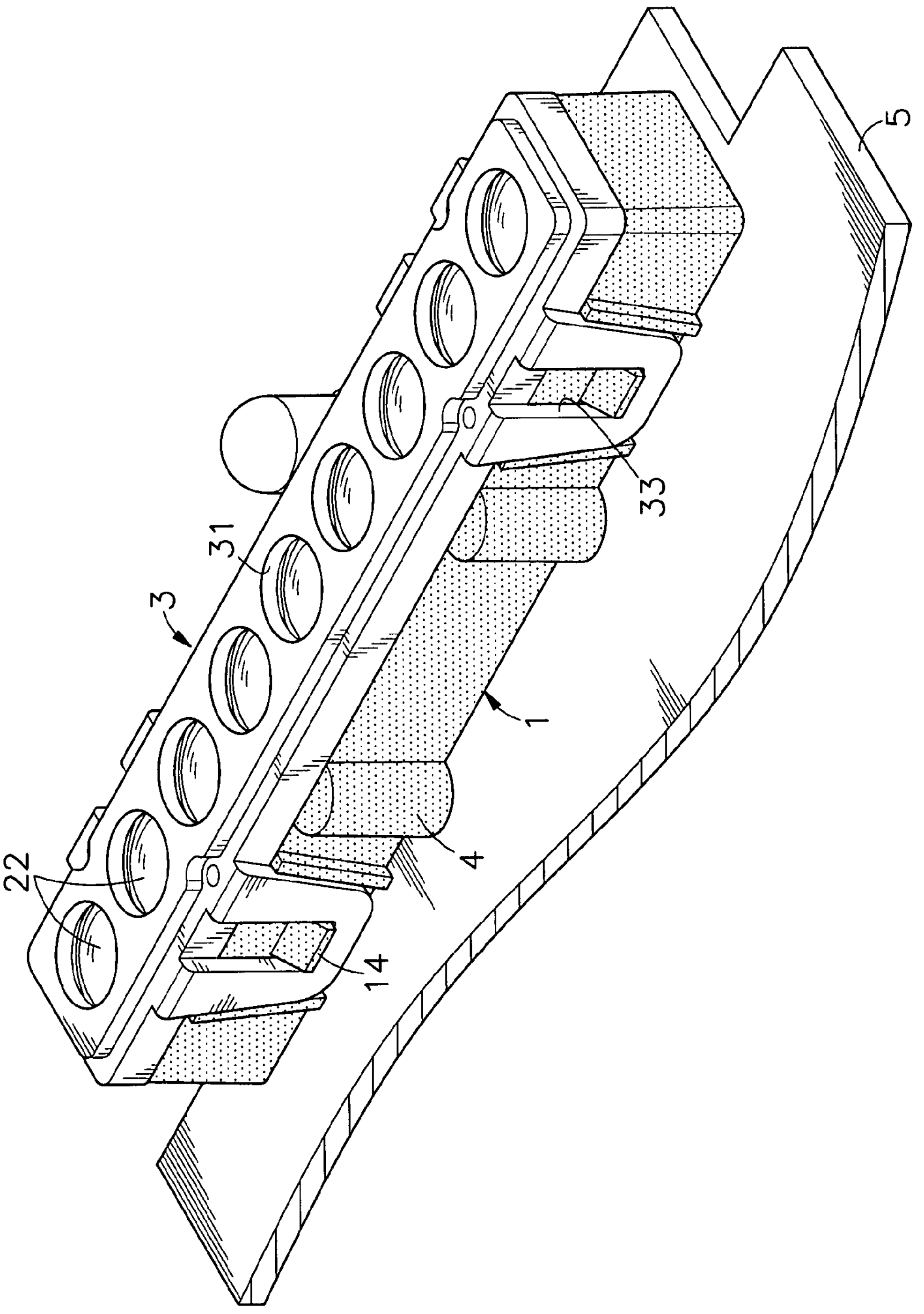
FIG. 1 is an elevational view of a lens module according to the present invention.
Figure 2:
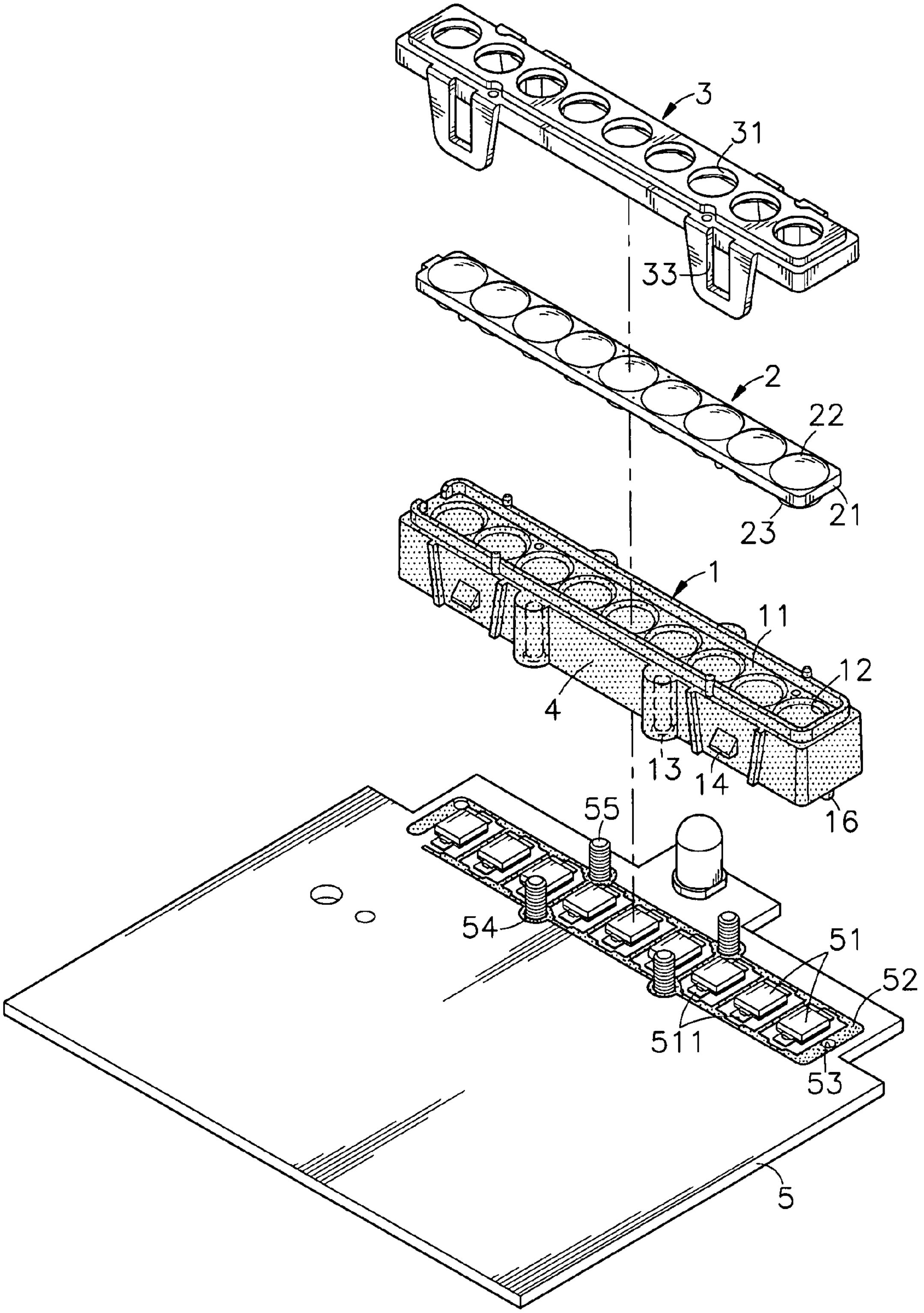
FIG. 2 is an exploded view of the lens module according to the present invention.
Figure 3:
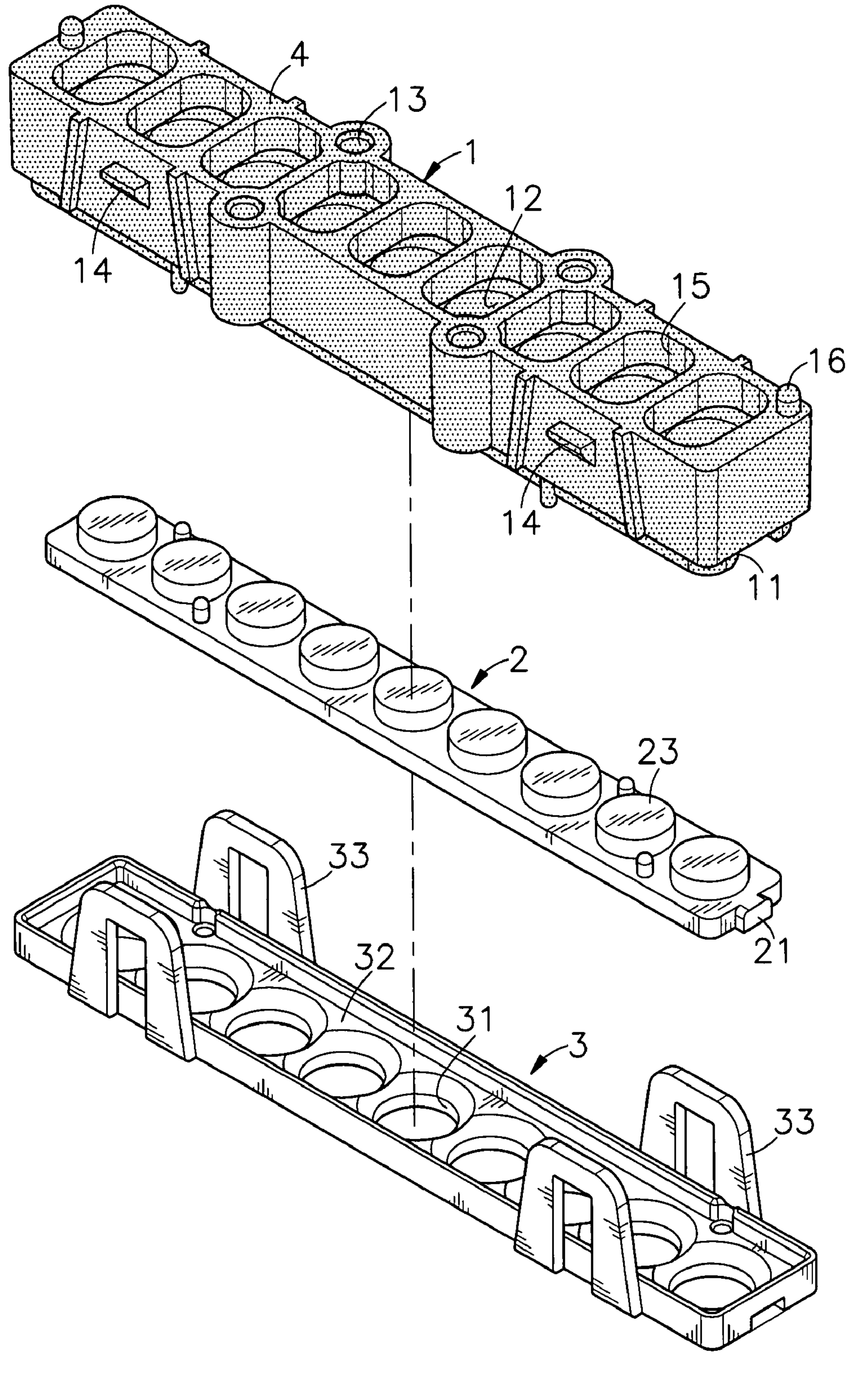
FIG. 3 is another exploded view of the lens module according to the present invention.

Referring to FIGS. 1~3, an anti-EMI (static electricity, radiowave, electromagnetic interference) lens module in accordance with the present invention is shown comprised of a holder base 1, a lens device 2 and a top cover 3.

The holder base 1 is a narrow elongated member having a top flange 11 upwardly extending from its top wall around the border, a plurality of vertical through holes 12 cut through its top and bottom walls and arranged in a row and surrounded by the top flange 11, a plurality mounting portions 13 symmetrically disposed at its two opposite lateral sides for fastening to a circuit board 5, a plurality of retaining blocks 14 protruded from its two opposite lateral sides and respectively disposed corresponding to the mounting portions 13, a plurality of bottom receiving holes 15 formed on its bottom wall corresponding to the vertical through holes 12, and a plurality of bottom mounting rods 16 extending from its bottom wall for fastening to the circuit board 5.

The lens device 2 is placed on the top wall of the holder base 1 and surrounded by the top flange 11, having a narrow elongated flat lens base 21, a plurality of convex lens portions 22 protruding from the top side of the flat lens base 21 corresponding to the through holes 12 of the holder base 1, a plurality of flat protrusions 23 protruded from the bottom side of the flat lens base 21 and shaped like a cylinder and respectively fitted into the through holes 12 of the holder base 1.

The top cover 3 is capped on the holder base 1 to hold down the lens device 2, thereby forming a lens module. The top cover 3 has a plurality of through holes 31 corresponding to the convex lens portions 22 of the lens device 2, a bottom recess 32, which receives the top flange 11 of the holder base 1 and the lens device 2, and a plurality of retaining lugs 33 downwardly extending from its two opposite lateral sides and respectively forced into engagement with the retaining blocks 14 of the holder base 1.

The surface of the holder base 1 is coated with a metal conducting layer 4. The thermal conductivity material for metal conducting layer 4 can be zinc, nickel, copper, any of a variety of thermal conductivity metal materials or their alloy. During installation, the lens device 2 is press-fitted into the space surrounded by the top flange 11 to force the flat protrusions 23 into the through holes 12 of the holder base 1, and then the top cover 3 is capped on the holder base 1 to force the retaining lugs 33 into engagement with the retaining blocks 14 of the holder base 1 respectively, keeping the convex lens portions 22 of the lens device 2 in the through holes 31 of the top cover 3 respectively.

Figure 4:
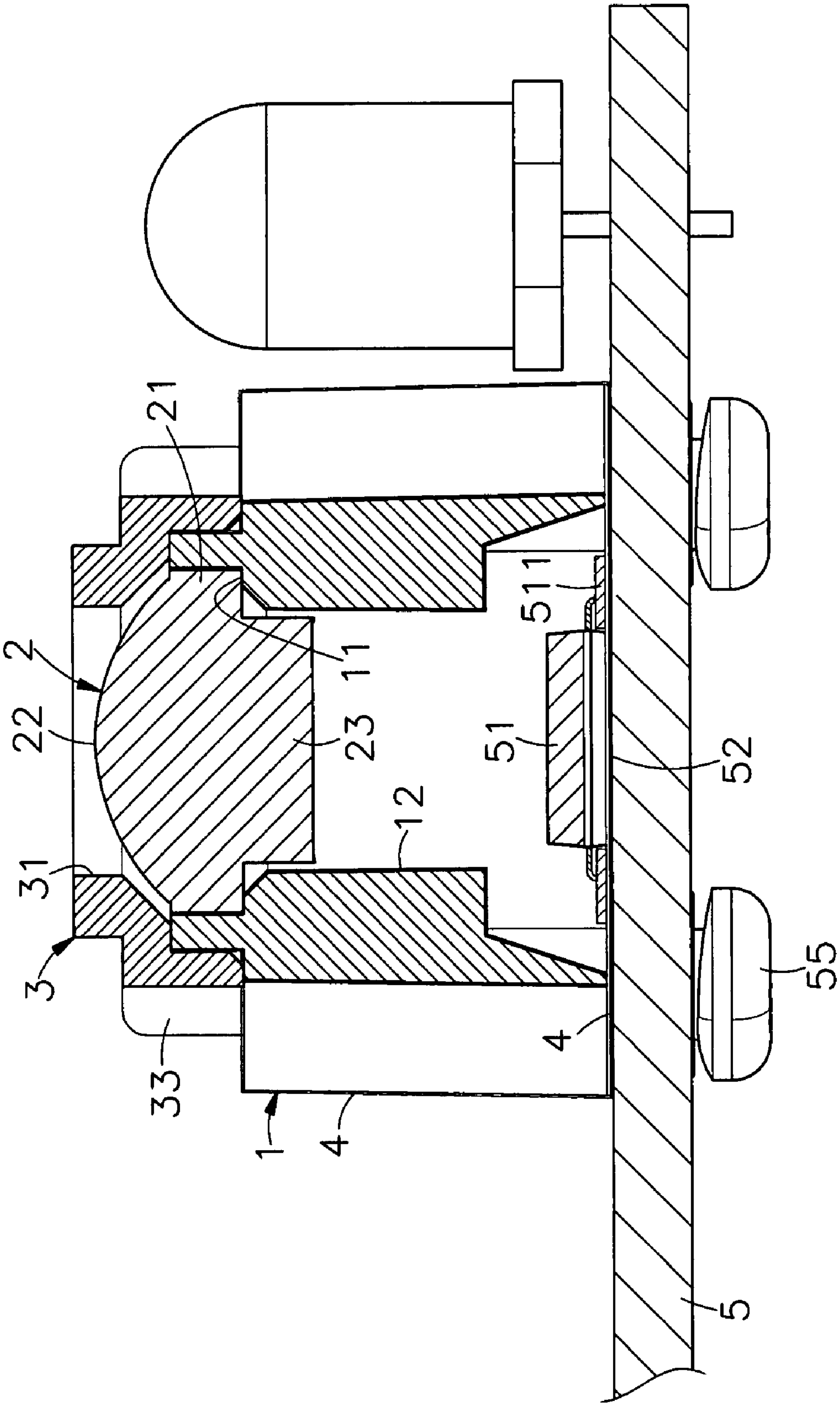
FIG. 4 is a schematic sectional view showing the lens module installed in a circuit board according to the present invention.

Referring to FIG. 4 and FIG. 2 again, the lens module of the present invention can easily be installed in the circuit board 5, which has a plurality of recognition devices 51 mounted thereon by means of SMT (Surface Mounting Technology), a grounding device 52 surrounding the recognition devices 51 and isolated from legs 511 of the recognition devices 51, a plurality of mounting through holes 54 cut through the grounding device 52 corresponding to the mounting portions 13 of the holder base 1, and a plurality of locating holes 53 corresponding to the bottom mounting rods 16 of the holder base 1. During installation, the bottom mounting rods 16 of the holder base 1 are respectively inserted into the locating holes 53 of the circuit board 5 to have the recognition devices 51 be respectively received in the bottom receiving holes 15 of the holder base 1, and then the mounting portions 13 of the holder base 1 are respectively affixed to respective mounting through holes 54 of the circuit board 5 with respectively screws 55. After installation, the recognition devices 51 are respectively aimed at the through holes 12 of the holder base 1 of the lens module, and the metal conducting layer 4 of the holder base 1 is electrically kept in contact with the grounding device 52 of the circuit board 5. Therefore, during a securities authenticity recognition action of the recognition devices 51, the metal conducting layer 4 absorbs cumulative statistic electricity and discharges received statistic electricity through the grounding device 52 of the circuit board 5, protecting the recognition devices 51 against static electricity, radiowave or electromagnetic interference and ensuring high reliability of the performance of the recognition devices 51.

In an alternate form of the present invention, the aforesaid metal conducting layer 4 is eliminated, and the holder base 1 is directly made out of a metal conducting material, such as zinc, nickel, copper or their alloy. After installation of the holder base 1 in the circuit board 5, it is electrically kept in contact with the grounding device 52 of the circuit board 5, and therefore the holder base 1 and the grounding device 52 constitute a grounding loop to protect the recognition devices 51 against static electricity, radiowave or electromagnetic interference. Further, the aforesaid metal conducting layer 4 may be electrically plated on the whole outer surface area of the holder base 1 or simply a selected part of the outer surface area of the holder base 1.

Figure 5:
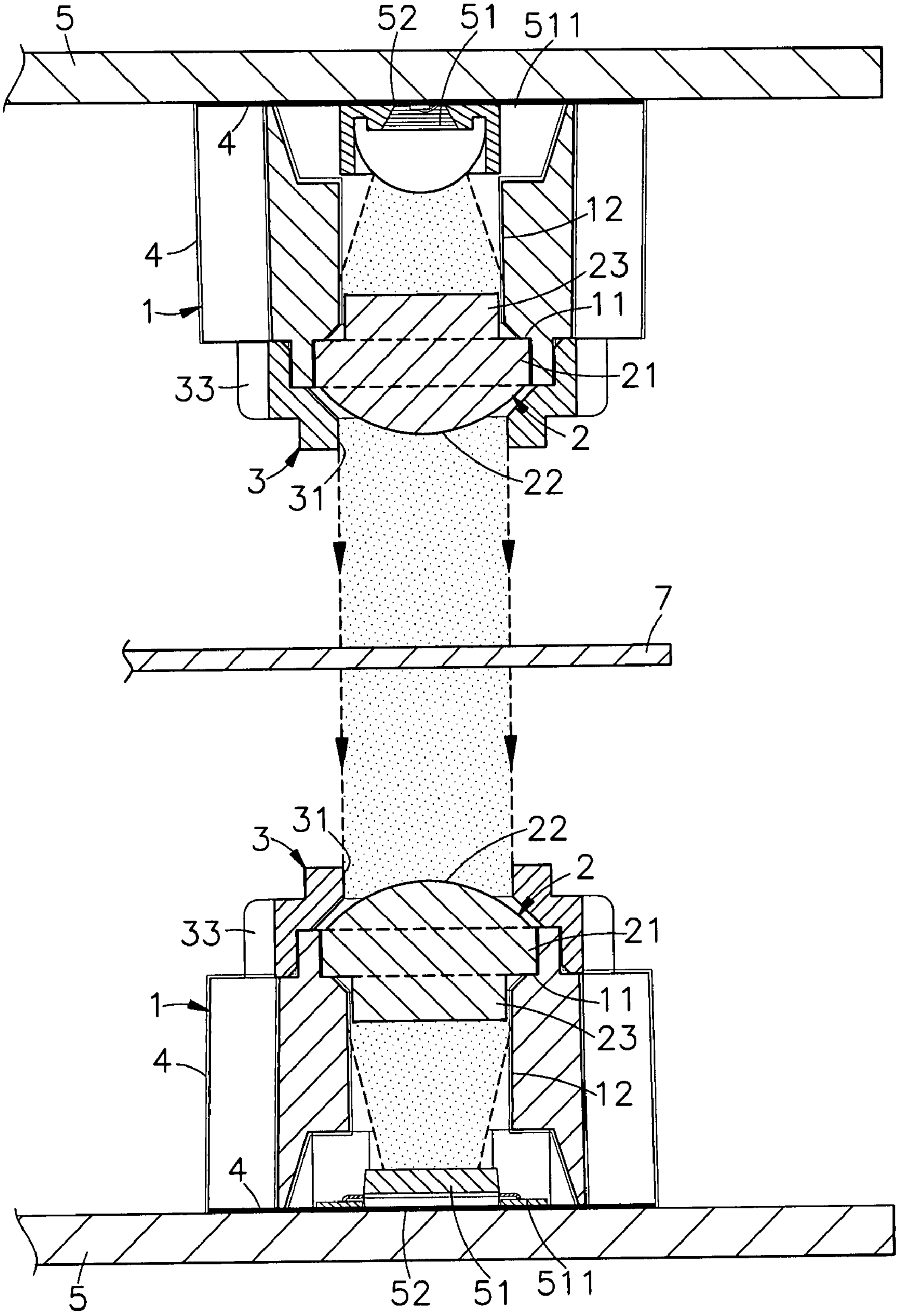
FIG. 5 is a schematic drawing showing an application example of the present invention in a bill acceptor.

Referring to FIG. 5, in actual practice, two lens modules are respectively installed in two circuit boards 5, and the two circuit board and lens module assemblies are set opposite to each other. One circuit board and lens module assembly is used as a light-emitting unit while the other circuit board and lens module assembly is used as a light-receiving unit. The light-emitting unit and the light-receiving unit are set in a bill acceptor (not shown) at two sides relative to a bill delivery path. When the recognition devices (for example, LEDs) 51 of the light-emitting unit are turned on, they emit light through the respective flat protrusions 23 and the respective convex lens portions 22 toward the convex lens portions 22 of the lens module of light-receiving unit. By means of the effect of the convex lens portions 22 of the lens module of the light-emitting unit, parallel light beams go to the convex lens portions 22 of the lens module of light-receiving unit, and then condensed by the respective flat protrusions 23 of the lens module of the light-receiving unit onto the respective recognition devices (for example, photo sensors) 51 of the light-emitting unit for checking the authenticity of a bill 7.

Further, the recognition devices 51 can be designed having multiple LED chips for emitting different wavelengths of light, for example, 615 nm~635 nm red light, 515 nm~532 nm green light, 460 nm~475 nm blue light, high transmissive 850 nm first infrared light or 940 nm second infrared light. By means of the control of the circuit board 5 of the light-emitting unit, intense pulsed light of different wavelengths can be given to one same portion of the bill 7 to be verified so that the security features of the bill 7 can be examined. The bill 7 to be verified can be a banknote, travel check, paper money, securities, etc. usable in automatic vending machines.

Figure 6:
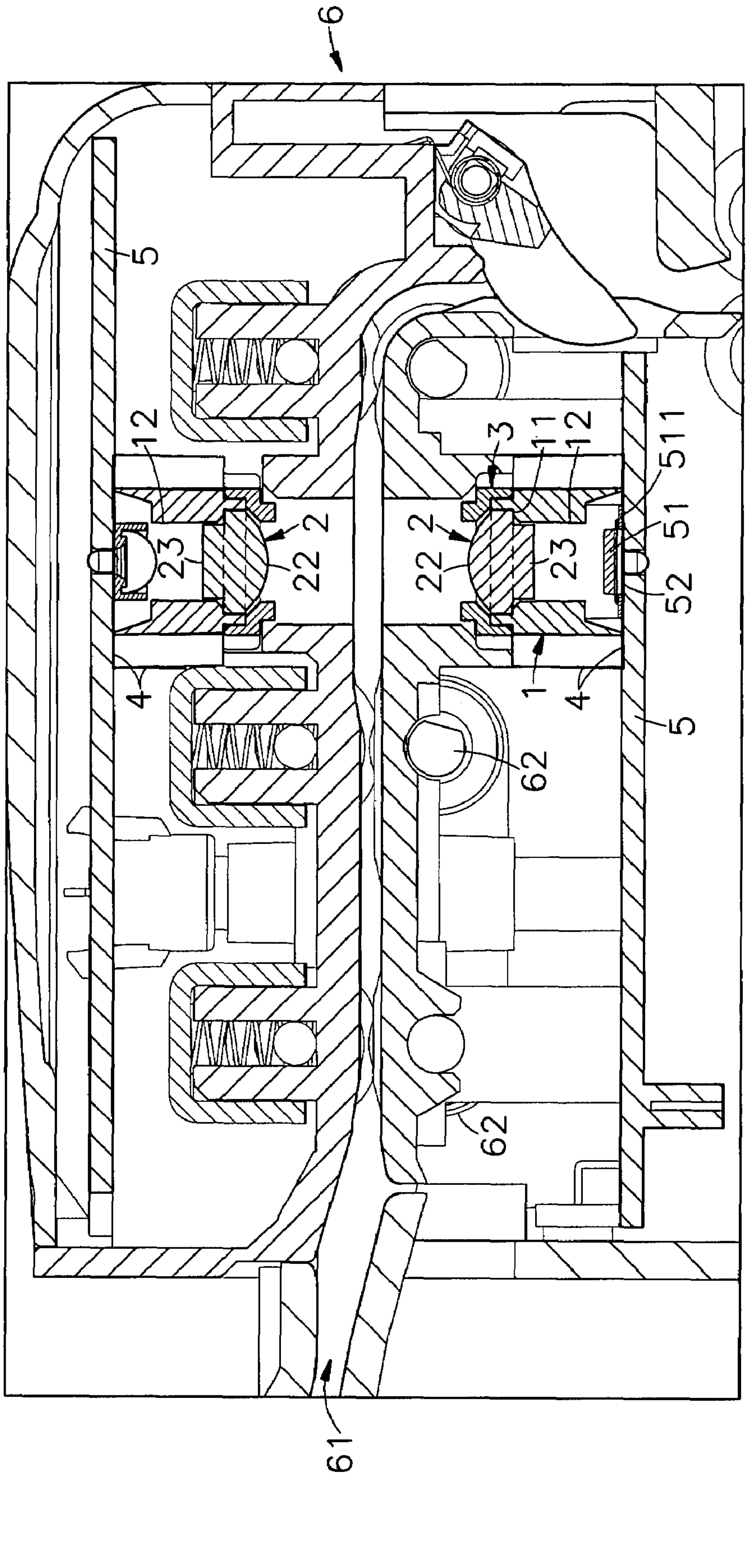
FIG. 6 is a sectional view of a part of a bill acceptor embodying the present invention.

FIG. 6 is a sectional view showing an application example of the present invention in a bill acceptor 6 of an automatic vending machine. When a bill 7 is inserted into a bill delivery path 61 in the bill acceptor 6, a bill transferring mechanism 62 of the bill acceptor 6 carries the bill 7 through a gap between the two lens modules (the lens module of the light-emitting unit and the lens module of the light-receiving unit). At this time, the circuit board 5 of the light-emitting unit controls the recognition devices (LEDs) 51 to emit intense pulsed light of different wavelengths through the associating lens module in direction from the associating flat protrusions 23 toward the associating convex lens portions 22, and the convex lens portions 22 of the lens module of the light-emitting unit direct emitted light from the respective recognition devices (LEDs) 51 to the same detected portion of the bill 7. When the light beam from each recognition devices (LEDs) 51 passes through the detected portion of the bill 7, it goes to the corresponding convex lens portion 22 of the lens module of the light-receiving unit and is further condensed by the associating flat protrusion 23 onto the associating recognition devices (photo sensors) 51. When induced by the light beams from the recognition devices (LEDs) 51, the recognition devices (photo sensors) 51 output a respective signal for comparing to a predetermined reference value set in the control unit of the bill acceptor 6 to determine the authenticity of the bill 7.

Verifying the authenticity of the bill 7 by means of the radiation of different wavelengths of light can be done in either one of two different ways. In one way, different wavelengths of light from the recognition devices (LEDs) 51 are emitted to one same detected portion of the bill 7, and the detected portion of the bill 7 provides different transmission rates for comparing to a predetermined reference value to verify the authenticity of the bill 7. In the other way, a particular transmissive light is produced upon radiation of different wavelengths of light subject to the effect of the ink of the bill 7, and the recognition devices (photo sensors) 51 pick up the transmissive light for comparing to the predetermined reference value to verify the authenticity of the bill 7.

As indicated above, the invention has the following features and benefits:

1. The electrically conductive holder base 1 is provided at the top side of the recognition devices 51 to form an EMI shielding device that discharge static electricity, protecting the recognition devices 51 against static electricity, radiowave and electromagnetic interference, enhancing the reliability, stability and durability of the recognition devices 51, and lowering the chance of detection error or failure of the recognition devices 51. Therefore, the use of the present invention in an automatic vending machine greatly reduces the chance of receiving false banknotes or machine shutdown.

2. When an automatic vending machine is used to sell tobacco, alcohol, drugs or other controlled products, it needs to recognize the age or real identification of the client and stores the related data in the memory of the bill acceptor 6 for checking whether the client meets the legal age requirement. By means of the effect of the metal conducting layer 4 on the holder base 1 to discharge static electricity through the grounding device 52 of the circuit board 5, the invention prevents loss of storage data, ensuring accurate checking of the client's legal age and identification.

3. Discharging of a big amount of cumulative static electricity may cause an electric shock, thereby damaging the internal electronic devices, circuit board and memory of the bill acceptor 6. In this case, a loss of storage data may occur. By means of the effect of the metal conducting layer 4 to absorb cumulative static electricity and to discharge absorbed static electricity through the grounding device 52 of the circuit board 5, the invention well protects the internal electronic devices and circuit board of the bill acceptor 6 against damage of static electricity, lowering the risk of failure and the maintenance cost.

4. Discharge of static electricity may damage the bill acceptor 6, and discharging sparks may cause inflammable gas or substance (valuable securities) to burn. By means of the effect of the metal conducting layer 4 to absorb cumulative static electricity and to discharge absorbed static electricity through the grounding device 52 of the circuit board 5, the invention prevents unexpected catastrophes resulting from discharging sparks. Therefore, the use of the design of the present invention in an automatic vending machine gives a good protection.

5. In the small-sized bill acceptor 6, static electricity may be produced at the friction area between parts, i.e., the friction area between the bill transferring mechanism 62 of the bill acceptor 6 and the bill 7. By means of the metal conducting layer 4 to discharge static electricity through the grounding device 52 of the circuit board 5, it needs not to install an additional static electricity eliminator in the limited inside space of the bill acceptor 6.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An anti-EMI lens module comprising:

a circuit board, said circuit board comprising a plurality of electric recognition devices and a grounding device surrounding said electric recognition devices;

a holder base mounted on said circuit board, said holder base having a plurality of through holes cut through top and bottom sides thereof and respectively aimed at said electric recognition devices and a metal conducting layer covered on an outer surface thereof and electrically disposed in contact with said grounding device of said circuit board and forming with said grounding device of said circuit board a grounding loop; and a lens device mounted in a top side of said holder base and covering said through holes of said holder base, wherein said lens device comprises a narrow elongated flat lens base supported on said holder base, a plurality of convex lens portions protruding from a top side of said flat lens base corresponding to said through holes of said holder base, and a plurality of flat protrusions protruded from a bottom side of said flat lens base and respectively fitted into said through holes of said holder base.

2. The anti-EMI lens module as claimed in claim 1, wherein said lens holder comprises a top flange extending around the border thereof and surrounding said lens device.

3. The anti-EMI lens module as claimed in claim 1, wherein said circuit board comprises a plurality of mounting through holes; said holder base comprises a plurality of mounting portions respectively affixed to said mounting through holes of said circuit board with a respective screw.

4. The anti-EMI lens module as claimed in claim 1, wherein said metal conducting layer is selected from one of the materials including zinc, nickel, copper and their alloy.

5. The anti-EMI lens module as claimed in claim 1, wherein said electric recognition devices are light emitting diodes and photo sensors.

6. The anti-EMI lens module as claimed in claim 1, wherein said electric recognition devices each have a plurality of legs isolated from said grounding device.

7. The anti-EMI lens module as claimed in claim 1, which is installed in a bill acceptor at two sides of a bill delivery path in said bill acceptor.

8. An anti-EMI lens module comprising:

a circuit board, said circuit board comprising a plurality of electric recognition devices and a grounding device surrounding said electric recognition devices;

a holder base mounted on said circuit board, said holder base having a plurality of through holes cut through top and bottom sides thereof and respectively aimed at said electric recognition devices and a metal conducting layer covered on an outer surface thereof and electrically disposed in contact with said grounding device of said circuit board and forming with said grounding device of said circuit board a grounding loop; and a lens device mounted in a top side of said holder base and covering said through holes of said holder base; and a top cover fastened to said holder base to hold down said lens device on said holder base, said top cover comprising a plurality of retaining lugs respectively hooked up with respective retaining blocks at said holder base.

9. The anti-EMI lens module as claimed in claim 8, wherein said top cover comprises a plurality of through holes respectively aimed at said convex lens portions of said lens device.

10. An anti-EMI lens module comprising a circuit board, said circuit board comprising a plurality of electric recognition devices and a grounding device surrounding said electric recognition devices;

a metal conducting holder base made out of a metal conducting material and mounted on said circuit board and forming with said grounding device of said circuit board a grounding loop, said metal conducting holder base having a plurality of through holes cut through top and bottom sides thereof and respectively aimed at said electric recognition devices; and a lens device mounted in a top side of said holder base and covering said through holes of said holder base, wherein said lens device comprises a narrow elongated flat lens base supported on said metal conducting holder base, a plurality of convex lens portions protruding from a top side of said flat lens base corresponding to said through holes of said metal conducting holder base, and a plurality of flat protrusions protruded from a bottom side of said flat lens base and respectively fitted into said through holes of said metal conducting holder base.

11. The anti-EMI lens module as claimed in claim 10, wherein said metal conducting holder base comprises a top flange extending around the border thereof and surrounding said lens device.

12. The anti-EMI lens module as claimed in claim 10, wherein said circuit board comprises a plurality of mounting through holes; said metal conducting holder base comprises a plurality of mounting portions respectively affixed to said mounting through holes of said circuit board with a respective screw.

13. The anti-EMI lens module as claimed in claim 10, further comprising a top cover fastened to said metal conducting holder base to hold down said lens device on said metal conducting holder base, said top cover comprising a plurality of retaining lugs respectively hooked up with respective retaining blocks at said metal conducting holder base.

14. The anti-EMI lens module as claimed in claim 13, wherein said top cover comprises a plurality of through holes respectively aimed at said convex lens portions of said lens device.

15. The anti-EMI lens module as claimed in claim 10, wherein said metal conducting holder base is selected from one of the materials including zinc, nickel, copper and their alloy.

16. The anti-EMI lens module as claimed in claim 10, wherein said electric recognition devices are light emitting diodes and photo sensors.

17. The anti-EMI lens module as claimed in claim 10, wherein said electric recognition devices each have a plurality of legs isolated from said grounding device.

18. The anti-EMI lens module as claimed in claim 10, which is installed in a bill acceptor at two sides of a bill delivery path in said bill acceptor.

* * * * *